(12) United States Patent
Adams et al.

(10) Patent No.: US 9,655,413 B2
(45) Date of Patent: May 23, 2017

(54) SELF ADHERING CONNECTION SURFACES, STRAPS, SNAPS AND BANDS

(71) Applicants: Thomas M. Adams, San Antonio, TX (US); James D. Benner, Jr., San Antonio, TX (US)

(72) Inventors: Thomas M. Adams, San Antonio, TX (US); James D. Benner, Jr., San Antonio, TX (US)

(73) Assignee: Thomas M. Adams, San Antonio, TX (US)

( * ) Notice: Subject to any disclaimer, the term of this patent is extended or adjusted under 35 U.S.C. 154(b) by 0 days.

(21) Appl. No.: 14/956,297

(22) Filed: Dec. 1, 2015

(65) Prior Publication Data

US 2016/0157565 A1 Jun. 9, 2016

Related U.S. Application Data

(63) Continuation-in-part of application No. 14/217,057, filed on Mar. 17, 2014, now Pat. No. 9,198,483.

(60) Provisional application No. 61/867,548, filed on Aug. 19, 2013, provisional application No. 61/800,427, filed on Mar. 15, 2013.

(51) Int. Cl.
*A44B 18/00* (2006.01)
*F16B 5/07* (2006.01)

(52) U.S. Cl.
CPC ...... *A44B 18/0061* (2013.01); *A44B 18/0007* (2013.01); *A44B 18/0019* (2013.01); *A44B 18/0053* (2013.01); *F16B 5/07* (2013.01); *Y10T 24/27* (2015.01); *Y10T 24/2792* (2015.01)

(58) Field of Classification Search
CPC ............ A44B 18/0007; A44B 18/0019; A44B 18/0049; A44B 18/0057; A44B 18/0061; Y10T 24/27
See application file for complete search history.

(56) References Cited

U.S. PATENT DOCUMENTS

| | | |
|---|---|---|
| 3,192,589 A | 7/1965 | Pearson |
| 3,930,287 A | 1/1976 | Grise et al. |
| 4,183,120 A | 1/1980 | Thorne |
| 5,067,210 A | 11/1991 | Keyaki |
| 5,119,531 A | 6/1992 | Berger et al. |
| 5,179,767 A | 1/1993 | Allan |
| 5,212,853 A | 5/1993 | Kaneko |
| 5,235,731 A | 8/1993 | Anzai et al. |
| 5,379,491 A | 1/1995 | Solo |

(Continued)

*Primary Examiner* — Robert J Sandy
*Assistant Examiner* — David Upchurch
(74) *Attorney, Agent, or Firm* — Kammer Browning PLLC

(57) ABSTRACT

A system of attachment surface structures that find their best use in the form of repeatedly removable straps and bands for securing one object to another. The surfaces are preferably constructed of narrow sheets of flexible polymer plastic materials having generally high tensile strength. A first embodiment includes shaped parallel ridges on one surface that interlock with mating parallel ridges on an opposing surface. These parallel ridges may be double sided (interlocking on both sides of each shaped ridge with the next shaped ridge on either side) or single sided (interlocking with a single ridge oriented 180 degrees from the first). Further embodiments include an array of shaped posts of various regular geometric shapes that interlock with an opposing array of identical posts.

11 Claims, 19 Drawing Sheets

(56) References Cited

U.S. PATENT DOCUMENTS

| | | | |
|---|---|---|---|
| 5,537,720 A | 7/1996 | Takizawa et al. | |
| 5,797,170 A | 8/1998 | Akeno | |
| 6,061,881 A | 5/2000 | Takizawa et al. | |
| 6,314,622 B1 | 11/2001 | Takizawa et al. | |
| 6,460,230 B2 | 10/2002 | Shimamura et al. | |
| 6,763,556 B2 | 7/2004 | Fagan et al. | |
| 6,983,517 B2 | 1/2006 | Golden et al. | |
| 7,678,318 B2 | 3/2010 | Line et al. | |
| D616,181 S | 5/2010 | Harada et al. | |
| 2001/0013277 A1* | 8/2001 | Galkiewicz | A44B 18/0053 100/2 |
| 2002/0069495 A1 | 6/2002 | Murasaki | |
| 2008/0134480 A1 | 6/2008 | Shiue | |
| 2009/0013506 A1* | 1/2009 | Mizuhara | A44B 18/0069 24/442 |
| 2010/0146743 A1 | 6/2010 | Rome | |
| 2012/0297581 A1 | 11/2012 | Pitman et al. | |
| 2013/0091667 A1* | 4/2013 | Zerfas | A44B 18/0007 24/449 |

\* cited by examiner (A-A')

(B-B')

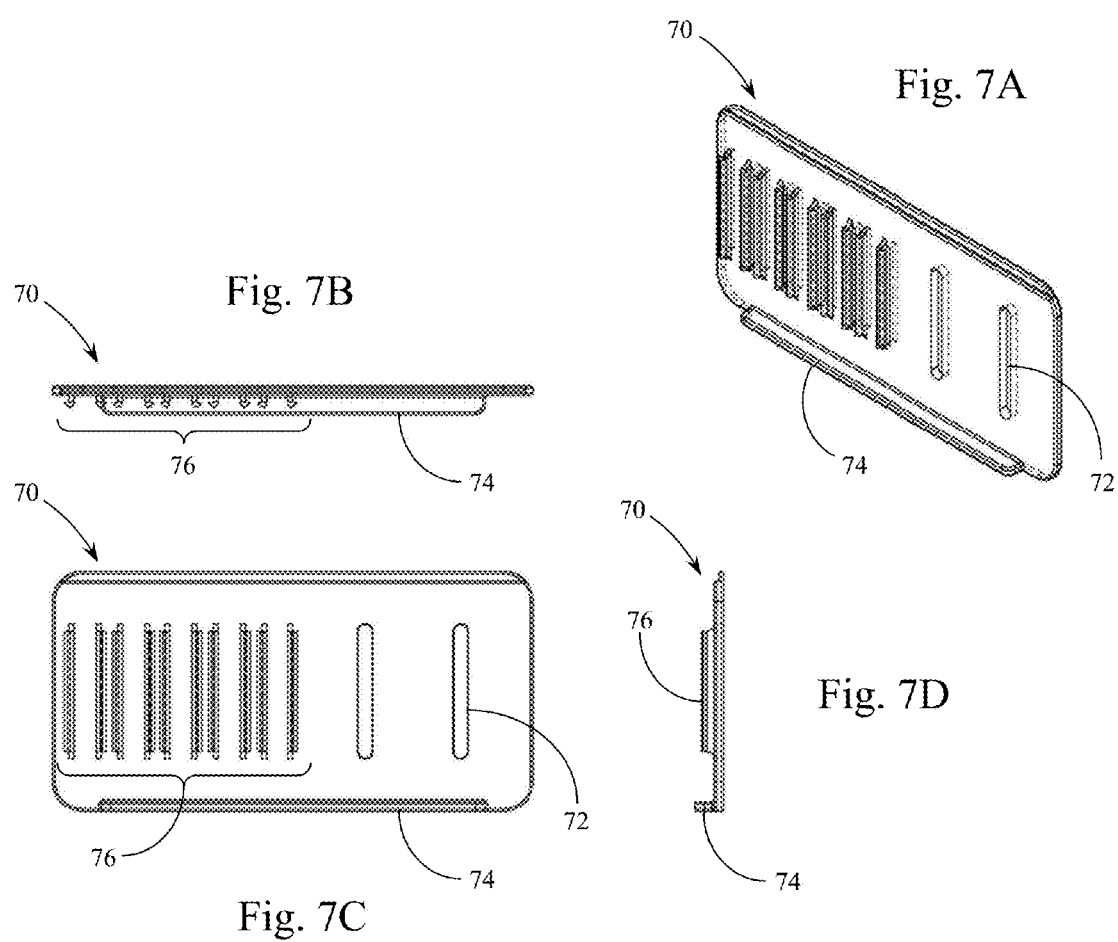

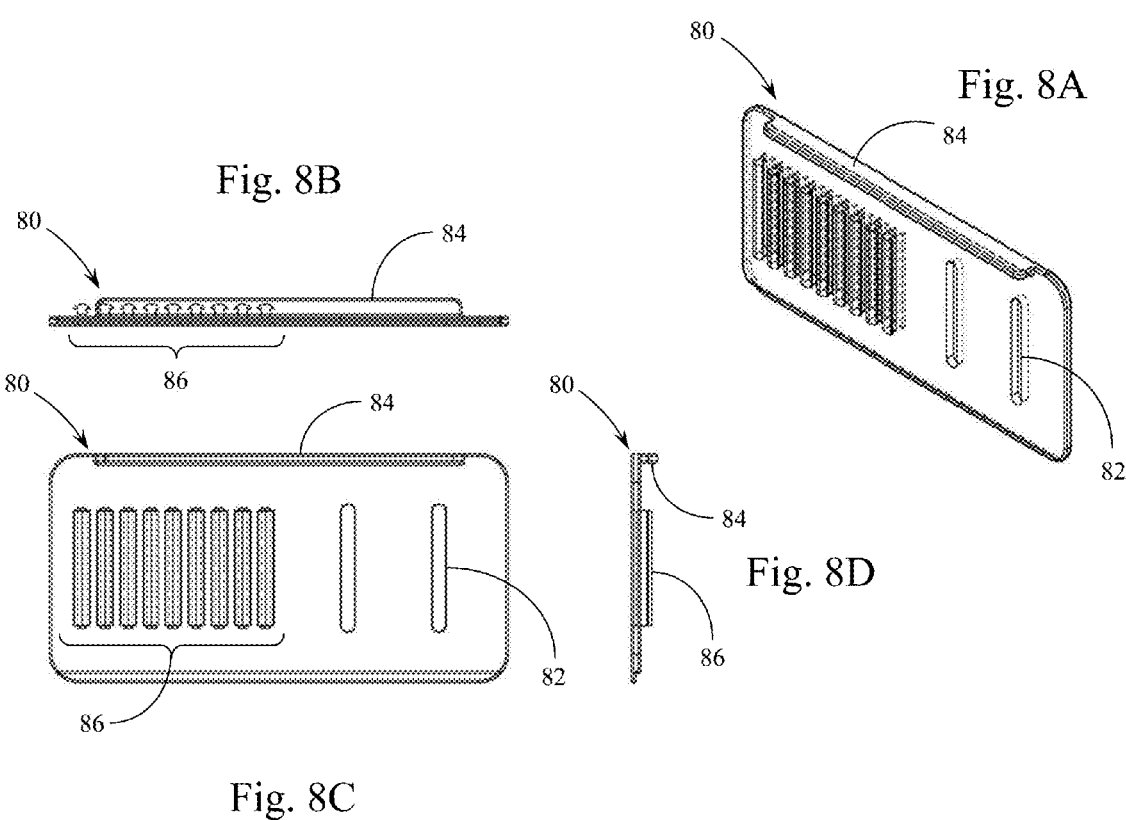

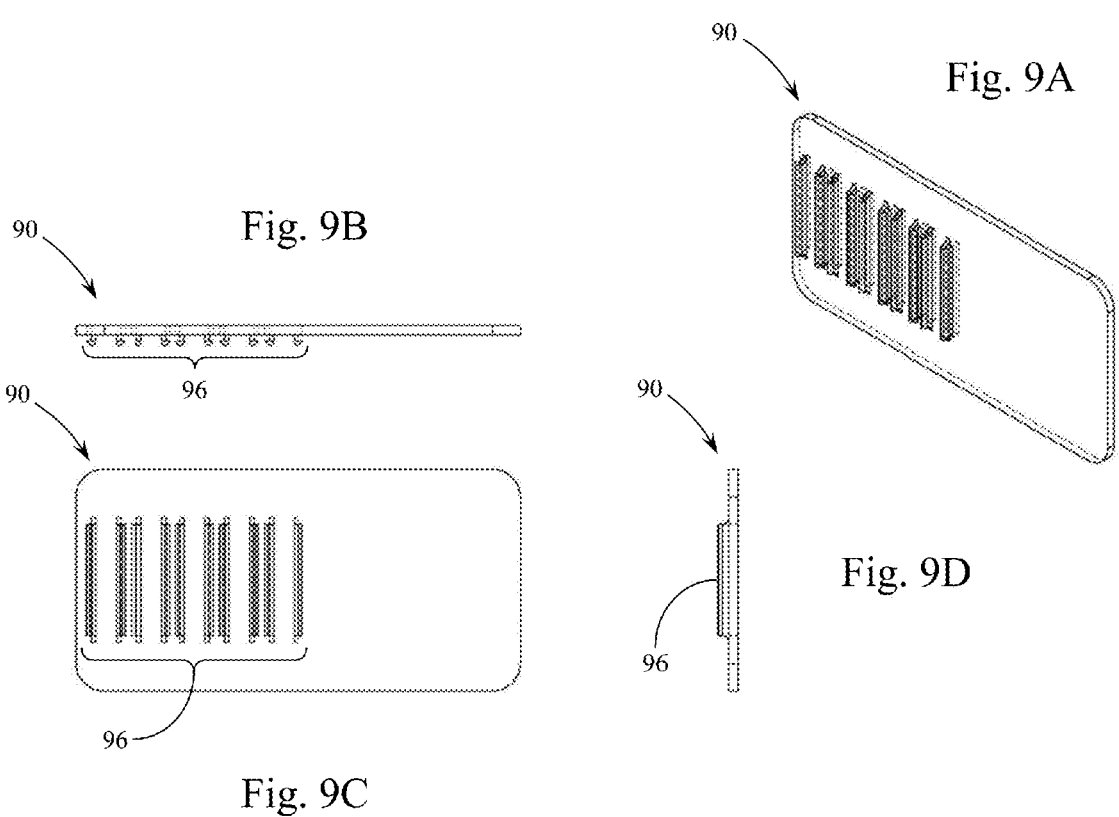

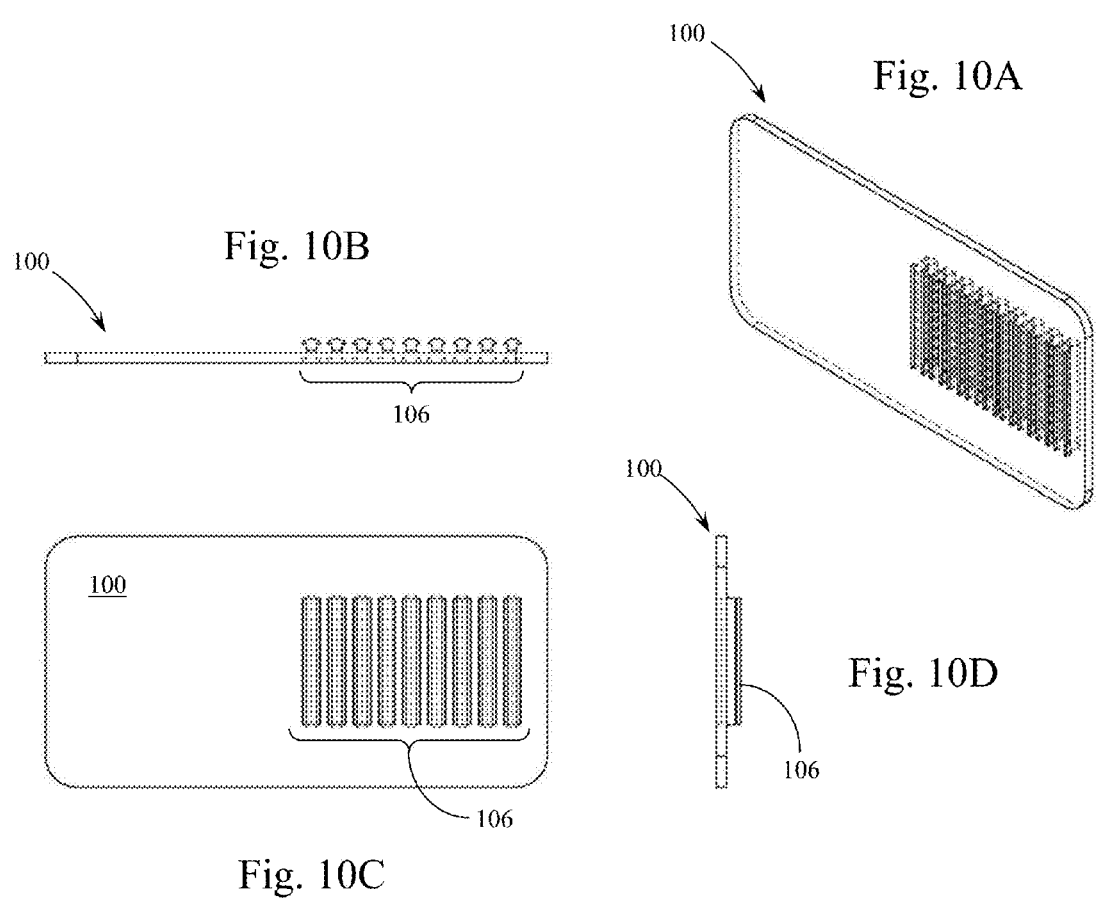

(C-C')

(Detail A)

(D-D')

(Detail B)

SELF ADHERING CONNECTION SURFACES, STRAPS, SNAPS AND BANDS

CROSS REFERENCES TO RELATED APPLICATIONS

This application claims the benefit under Title 35 United States Code §120 of U.S. patent application Ser. No. 14/217,057; filed Mar. 17, 2014 and under Title 35 United States Code §119(e) of U.S. Provisional Patent Application Ser. No. 61/800,427, filed: Mar. 15, 2013; and U.S. Provisional Patent Application Ser. No. 61/867,548, filed: Aug. 19, 2013, the full disclosures of which are each incorporated herein by reference.

BACKGROUND OF THE INVENTION

1. Field of the Invention

The present invention relates generally to attachment surfaces, straps and bands. The present invention relates more specifically to an attachment surface structured to allow identical sections of the surface to removably attach together.

2. Description of the Related Art

Efforts have been made in the past to provide surfaces (most often in the form of straps or bands) that removably and repeatedly adhere to each other for the purpose of securing one object to another. One example of such types of surfaces is a hook surface operable in conjunction with a loop surface, developed and marked under the brand name Velcro®. Hook and loop surfaces suffer from a number of drawbacks. Both surfaces tend to collect fibrous dust, strings, and other material that fouls the surfaces and degrades their ability to adhere to one another. A further disadvantage of hook and loop surfaces is the requirement to manufacture and sell two different types of surfaces rather than a single type of surface that can adhere to another section of the same type of surface.

It would be desirable to have attachment surfaces that overcame the problems associated with the more common hook and loop combination surfaces. It would be desirable if a single type of surface could be manufactured and two sections of the single type of surface would adhere to each other. It would be desirable if the surfaces were not prone to become fouled with fibers, dust, threads, and other materials that might degrade their function.

SUMMARY OF THE INVENTION

In fulfillment of the above objectives the present invention provides a number of attachment surface structures that find their best use in the form of repeatedly removable straps and bands for securing one object to another. The surfaces are preferably constructed of narrow sheets of flexible polymer plastic materials having generally high tensile strength (bendable but not stretchable). A first set of embodiment includes shaped parallel ridges on one face of strap or band that interlock with mating parallel ridges on an opposing strap or band. These parallel ridges may be double sided (interlocking on both sides of each shaped ridge with the next shaped ridge on either side) or single sided (interlocking with a single ridge oriented 180 degrees from the first). A second set of embodiments includes an array of "umbrella" shaped posts that interlock with an opposing array of identical posts on a second section of strap. The second set of embodiments may be constructed using a variety of regular geometric shapes (square, triangle, pentagon, and hexagon, for example) that permit adherence between the surfaces in other than laterally aligned orientations.

BRIEF DESCRIPTION OF THE DRAWINGS

FIG. 7A is an isometric view of a further embodiment of the present invention showing a connector top with attachment slots and alignment bar.

FIGS. 7B-7D are three orthographic views of the connector top shown in FIG. 7A.

FIG. 8A is an isometric view of a further embodiment of the present invention showing a connector bottom with attachment slots and alignment bar.

FIGS. 8B-8D are three orthographic views of the connector bottom shown in FIG. 8A.

FIG. 9A is an isometric view of a further sew-on embodiment of the present invention showing a connector top.

FIGS. 9B-9D are three orthographic views of the connector top shown in FIG. 9A.

FIG. 10A is an isometric view of a further sew-on embodiment of the present invention showing a connector bottom.

FIGS. 10B-10D are three orthographic views of the connector bottom shown in FIG. 10A.

DETAILED DESCRIPTION OF THE PREFERRED EMBODIMENTS

Figure 1:
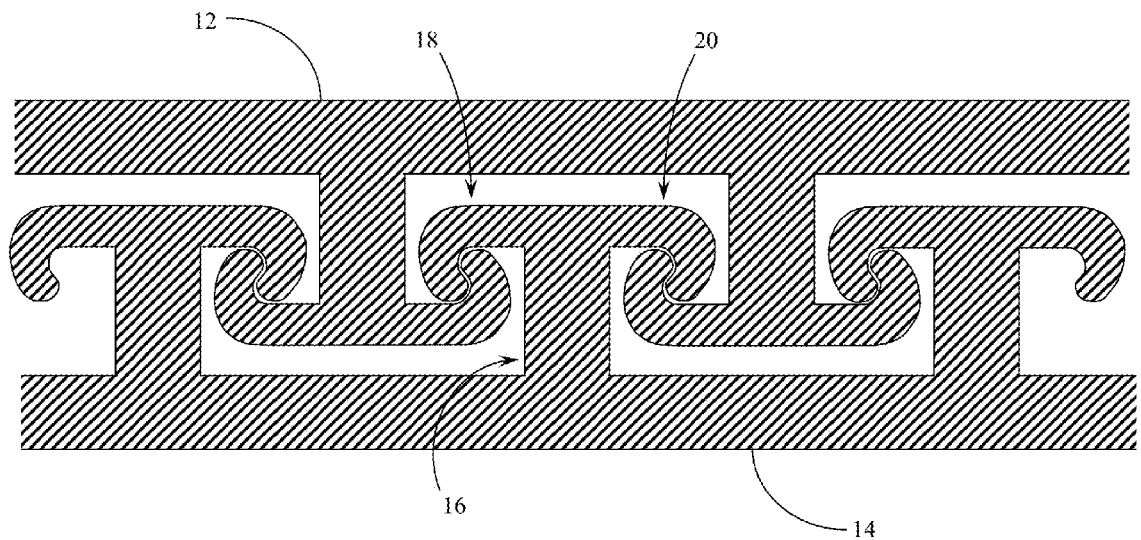
FIG. 1 is a detailed cross-sectional view of a double sided embodiment of the attachment surfaces system of the present invention, viewed along Section Line A-A' in FIG. 5.

Reference is made first to FIG. 1 which is a detailed cross-sectional view of a double sided embodiment of the attachment surfaces system of the present invention. The cross section shown in FIG. 1 represents the structure of both a double sided ridge based embodiment and a double (or multiple) sided post embodiment. The structure could, for example reflect a cross section of the embodiment shown in FIG. 5 (square post array) as viewed along Section Line A-A' therein, as well as a double sided parallel ridge embodiment. In either case the flexible material from which the generally flat straps or bands 12 & 14 are constructed to allow the ridges (or posts) 16 from one surface to press into and interlock with the same ridges (or posts) present on an opposing strap or band. This interlock is achieved between what are essentially the same structures positioned in opposition to each other. In FIG. 1 these structures represent arms 18 & 20 extending off of ridge (or post) 16 that interlock with corresponding arms positioned on the opposing strip. This interlock maintains adherence between the surfaces, especially in the face of longitudinal force. The surfaces may separate relatively easily with a transverse rolling force (see FIG. 4) when the user wants to separate the surfaces.

Figure 2:
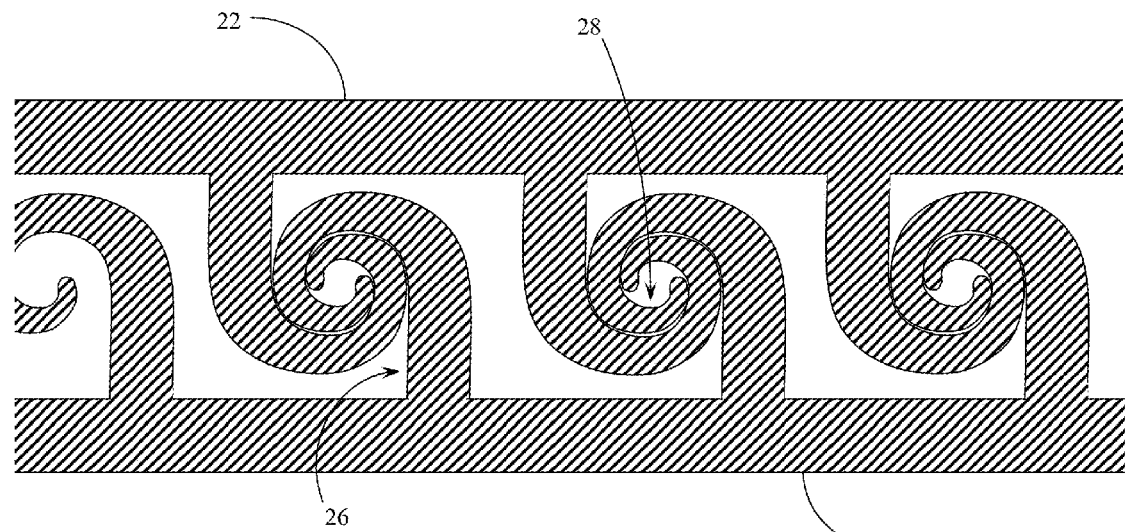
FIG. 2 is a detailed cross-sectional view of a single sided embodiment of the attachment surfaces system of the present invention, viewed along Section Line B-B' in FIG. 4.

FIG. 2 is a detailed cross-sectional view of a single sided embodiment of the attachment surfaces system of the present invention, essentially eliminating one interlocking side of each parallel ridge. In FIG. 2, flat straps or bands 22 & 24 are constructed to allow the ridges (or posts) 26 from one surface to press into and interlock with the same ridges (or posts) present on an opposing strap or band. In this embodiment, a single curled arm 28 extends from ridge (or post) 26 to interlock with a corresponding curled arm from the opposing strap or band. The embodiment shown in FIG. 2 retains the strength of adherence by increasing the degree to which the ridges interlock. While this maintains the hold between the surfaces in one direction it does reduce the hold in the opposing direction. This characteristic may be beneficial where the desire is to secure a strap or band pulled in one direction from being released in the opposite direction. This would be helpful where, for example, a strap is used to tighten or close one component over and against another, such as in a shoe or a tie down, where an opposing force is oriented in the direction that the surface to surface adherence is strongest.

Figure 3:
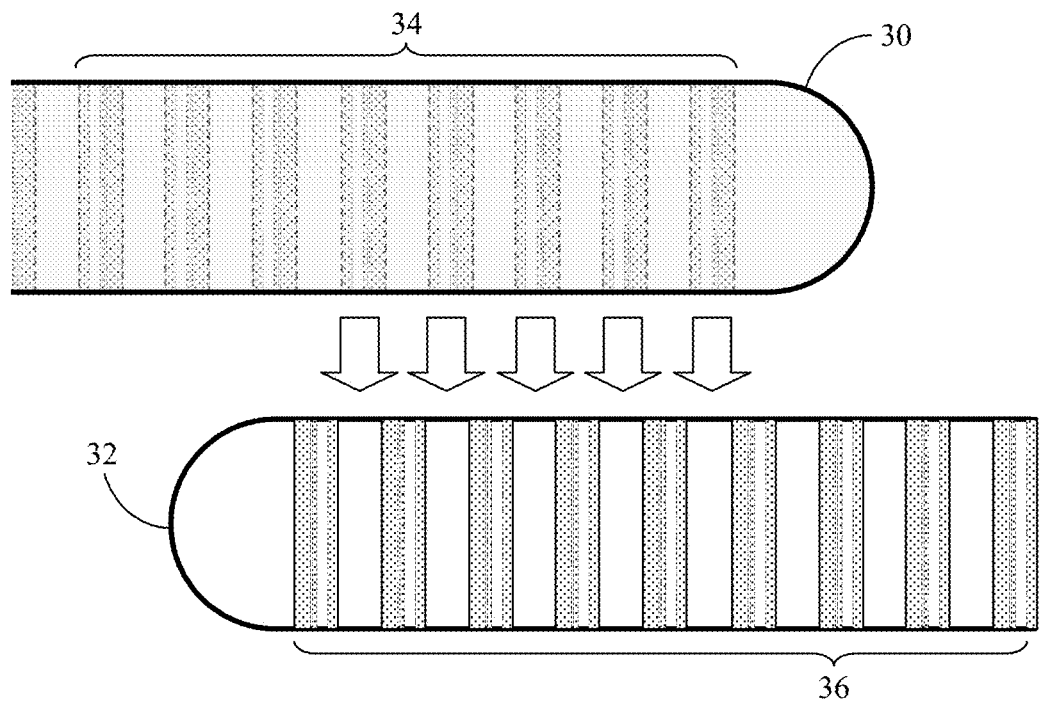
FIG. 3 is a top plan view of two opposing straps implementing the parallel ridge embodiment of the attachment surfaces system of the present invention, the straps shown separated before attachment.
Figure 4:
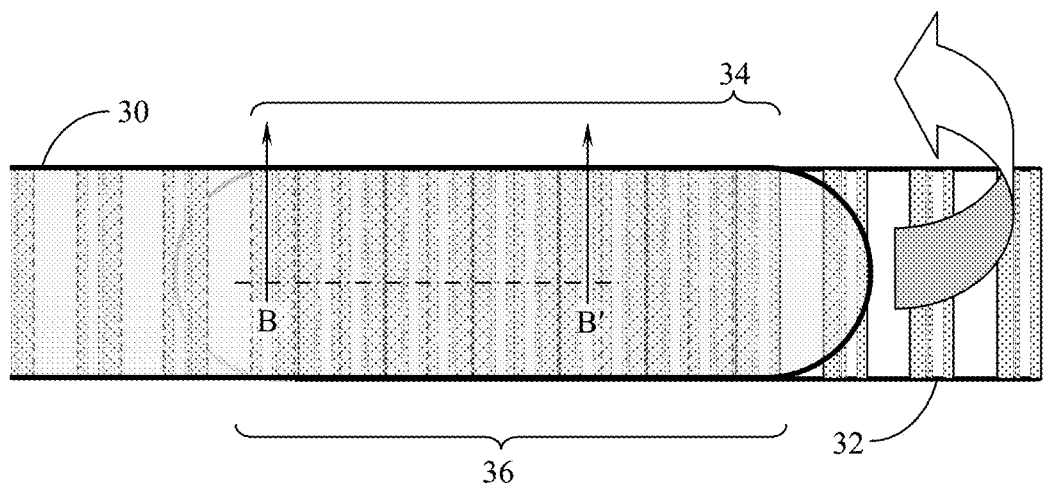
FIG. 4 is a top plan view of two opposing straps implementing the parallel ridge embodiment of the attachment surfaces system of the present invention, the straps shown overlaid and attached one to the other.

The cross section view of FIG. 2 best represents the parallel ridge structure shown in FIGS. 3 & 4, as viewed along Section Line B-B' in FIG. 4. Again, orientation of the straps 22 & 24 is such that the force that tends to longitudinally pull the straps apart is most strongly resisted by the interlocking structure. The flexibility of the interlocking "arms" 28 (seen in cross section) on each ridge 26 allows for the structures to coil together as shown in FIG. 2. Pulling the straps 22 & 24 apart (in a direction orthogonal to the surfaces) allows these interlocking structures to uncoil and release. Once again, one of the most important features of the present invention is the identical structure of the two opposing surfaces 22 & 24.

FIG. 3 is a top plan view of two opposing straps 30 & 32 implementing the parallel ridge 34 embodiment of the attachment surfaces system of the present invention, the straps 30 & 32 shown separated before attachment. The lower strap 32 (oriented with the rounded end to the left) shows the parallel ridges 36 on its upper face. The upper strap 30 (oriented with the rounded end to the right) shows the hidden parallel ridges 34 in broken line form for purposes of viewing how the ridges 34 & 36 align and interlock. Reference is again made to FIG. 2 for the best representation of this interlocking action. The arrows in FIG. 3 show the manner in which the straps 30 & 32 may be pressed together to achieve the interlocking action.

FIG. 4 is a top plan view of the two opposing straps 30 & 32 implementing the parallel ridge embodiment shown in FIG. 3; the straps 30 & 32 shown overlaid and attached one to the other. The curved arrow in FIG. 4 shows the manner in which the top strap 30 may be pulled up and back so as to release the interlocking structures and separate the straps. Adjustment of the longitudinal tightness of the straps may be made by pulling one strap further along the other, incrementally moving to the next ridges on the second strap for each of the parallel opposing ridges on the first strap. In this manner, the strength of the longitudinal force (the tightness) may be incrementally increased or decreased.

Figure 5:
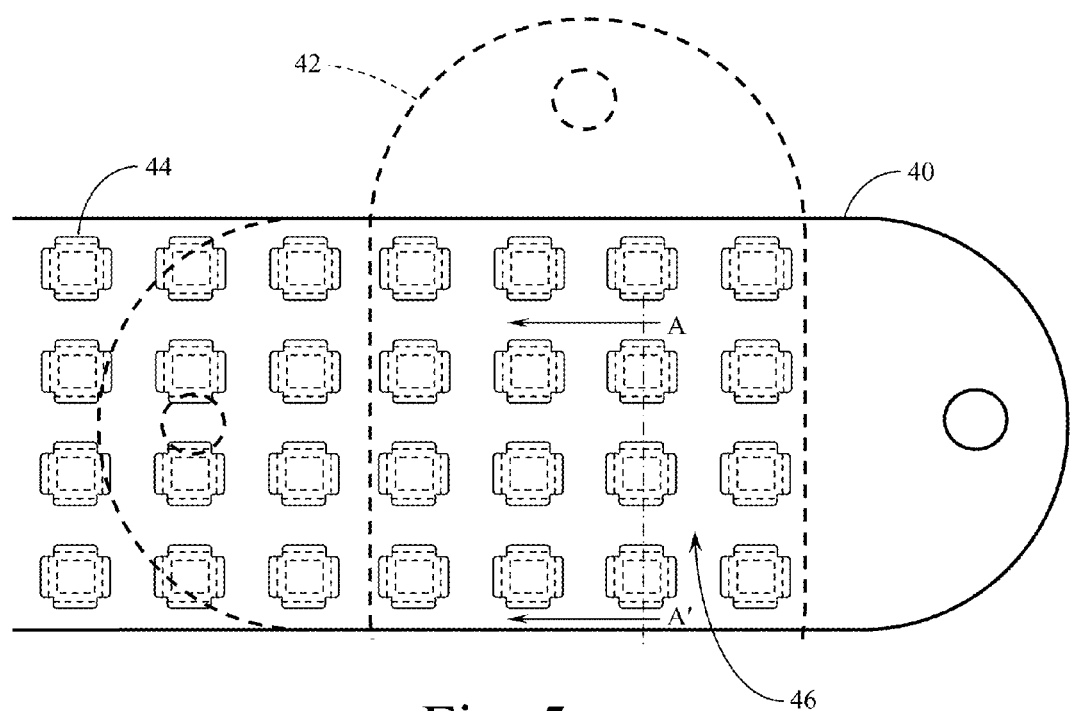
FIG. 5 is a top plan view of one strap implementing the post array (square) embodiment of the attachment surfaces system of the present invention, a second opposing strap shown in broken line form to show the multiple orientations possible with the embodiment.
Figure 6:
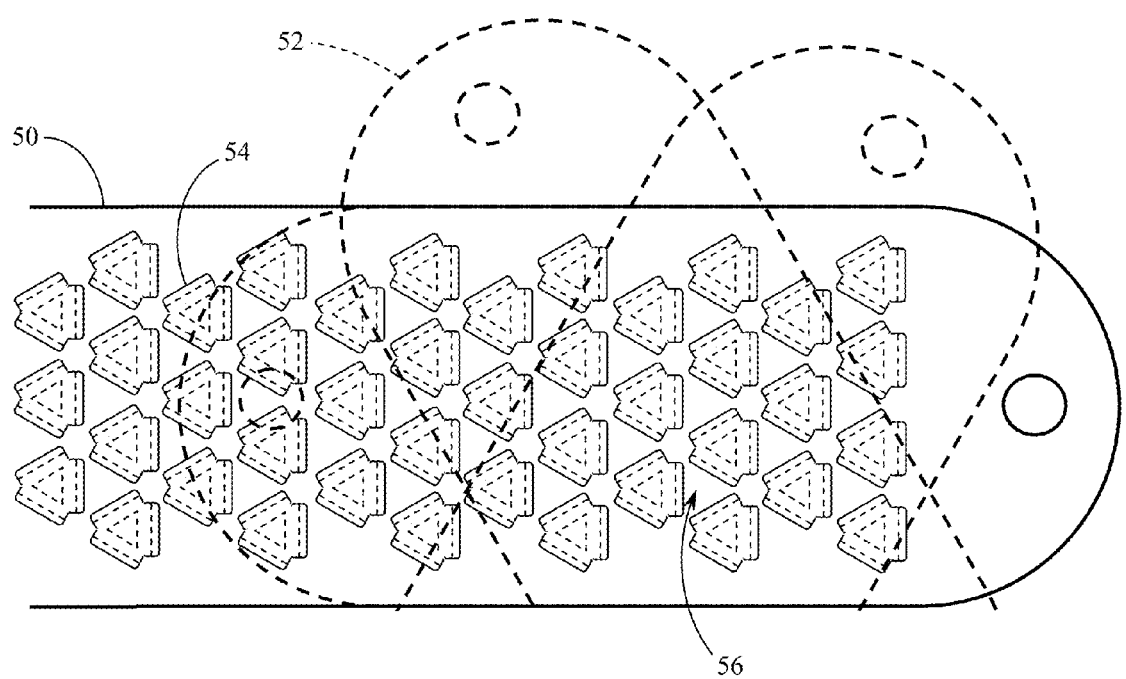
FIG. 6 is a top plan view of one strap implementing the post array (triangular) embodiment of the attachment surfaces system of the present invention, a second opposing strap shown in broken line form to show the multiple orientations possible with the embodiment.
Figure 11B:
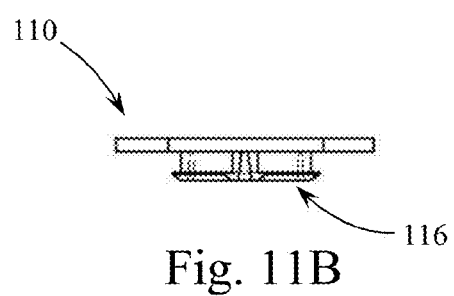
FIGS. 11B-11D are three orthographic views of the triangular snap connector inner connector half shown in FIG. 11A.
Figure 11A:
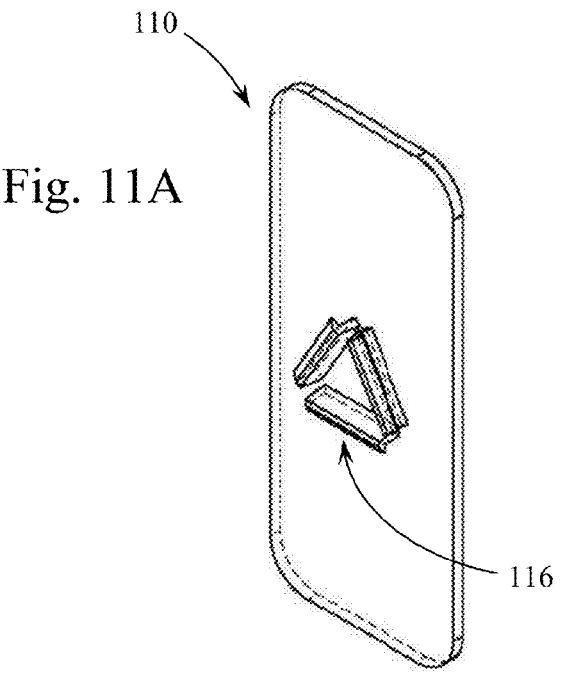
FIG. 11A is an isometric view of a further triangular snap connector embodiment of the present invention showing the inner connector half.
Figure 11C:
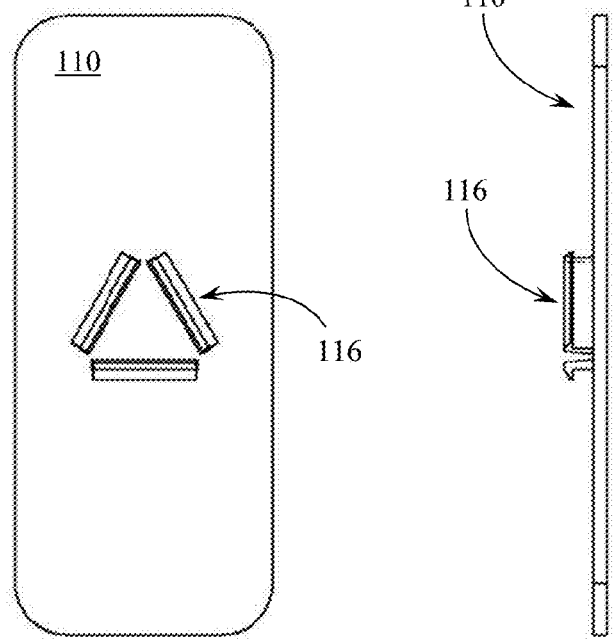
Figure 11D:
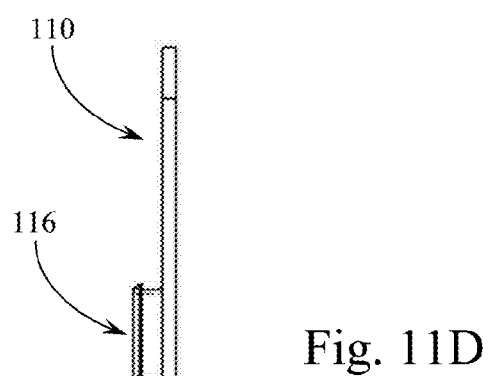
Figure 12B:
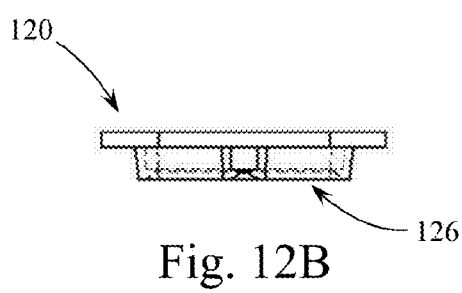
FIGS. 12B-12D are three orthographic views of the triangular snap connector outer connector half shown in FIG. 12A.
Figure 12A:
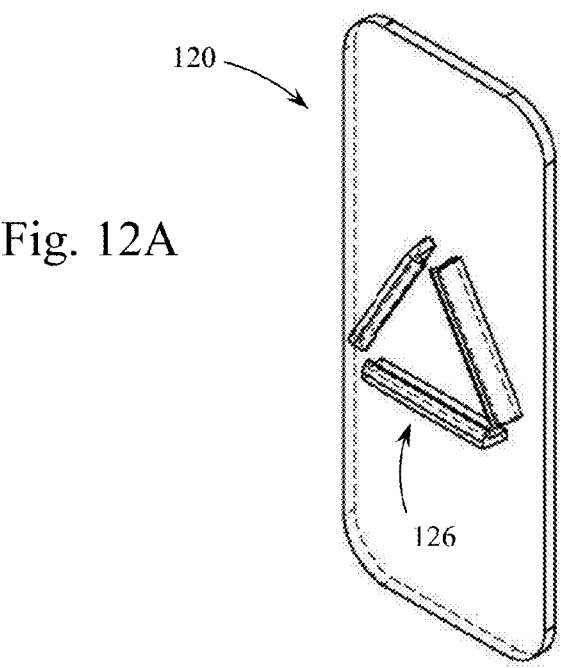
FIG. 12A is an isometric view of a further triangular snap connector embodiment of the present invention showing the outer connector half
Figure 12C:
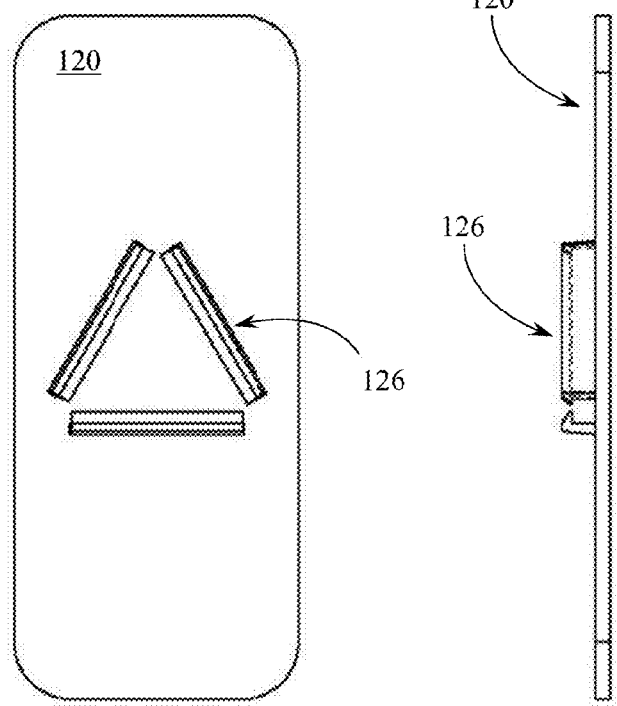
Figure 12D:
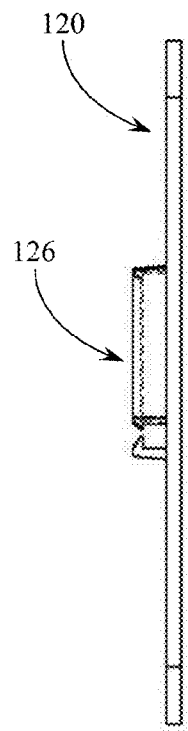

Reference is next made to FIGS. 5 & 6 for a description of an alternate post array embodiment of the present invention. Whereas the parallel ridge embodiment lends itself to strength of attachment when one strap is oriented parallel to the other (directly overlaying), the post array embodiment allows for non-aligned orientation of the straps.

FIG. 5 is a top plan view of one strap 40 implementing the post array 44 (square) embodiment of the attachment surfaces system of the present invention, a second opposing strap 42 shown in broken line form to show the multiple orientations possible with the embodiment. With each "umbrella" shaped post 44 (seen from the top in this view) having four interlocking structures (oriented outward 90 degrees to each other) a similar surface may interlock into an opposing space 46 in either a longitudinal or a transverse orientation (as shown in broken line form). Although a strap implementation of this embodiment is shown in FIG. 5, the post array embodiment lends itself to implementation with larger patches of attachment surfaces that may serve to secure more than one strap, possibly oriented in two directions.

FIG. 6 is a top plan view of one strap 50 implementing the post array 54 (triangular) embodiment of the attachment surfaces system of the present invention, a second opposing strap 52 shown in broken line form to show the multiple orientations possible with this embodiment. With a triangular post structure 54 the attachment orientation may be in 60 degree rotations as shown with respect to an opposing space 56. Here again, although a strap implementation of this embodiment is shown in FIG. 6, the post array embodiment lends itself to implementation with larger patches of attachment surfaces that may serve to secure more than one strap, possibly oriented in two or more different directions. A single larger circular patch of material could, for example, receive and secure three separate straps coming together from three different directions (generally at 60 degrees of rotation from each other).

Implementation of the post array embodiment of the present invention may be made also with other regular geometric structures, most notably with hexagonal post configurations. Increasing the number of sides does however decrease the length of each interlocking grip thereby diminishing somewhat the strength of the hold. Nonetheless there are likely applications where increased options with regard to orientation are preferred over the strength of the hold.

FIGS. 7A-7D are an isometric view and three orthographic views of a further embodiment of the present invention showing a connector top 70 with attachment slots 72 and alignment bar 74. FIGS. 8A-8D are an isometric view and three orthographic views of a corresponding connector bottom 80 mateable to the connector top 70 shown in FIGS. 7A-7D. In this embodiment, attachment slots 72 & 82 are shown in each component 70 & 80 for attaching the components to the materials to be connected (such as straps, panels, or the like). In this embodiment, parallel ridges 76 are positioned on connector top 70 and comprise paired ridges 76 with opposing, inwardly directed, pointed edges as shown in FIG. 7B. These paired ridges 76 interlock with ridges 86 on opposing connector bottom 80. Ridges 86 comprise single walled ridges with caps having opposing pointed edges that engage with the inwardly directed pointed edges of paired ridges 76. Additionally, alignment bars 74 & 84 are disclosed on components 70 & 80 to facilitate the aligned mating of the connector component ridges 76 & 86.

FIGS. 9A-9D are an isometric view and three orthographic views of a further embodiment of the present invention showing a connector top 90 designed to be sewn onto a substrate to be connected. FIGS. 10A-10D are an isometric view and three orthographic views of a corresponding connector bottom 100 mateable to the connector top 90 shown in FIGS. 9A-9D. In this embodiment, each component 90 & 100 is sewn onto the materials to be connected (such as straps, panels, or the like). Ridges 96 shown in FIG. 9B on connector top 90 are essentially the same as those shown in FIGS. 7A-7D. Likewise, ridges 106 shown on connector bottom 100 are essentially the same as those shown on connector bottom 80 in FIGS. 8A-8D.

FIGS. 11A-11D are an isometric view and three orthographic views of a further triangular snap connector embodiment showing strap 110 with the inner connector half 116. FIGS. 12A-12D are an isometric and three orthographic views of a corresponding strap 120 with outer connector half 126 mateable to the inner connector half 116 shown in FIGS. 11A-11D. With the triangular version shown, the inner and outer halves 116 & 126 may be aligned at 0°, 60°, or 300° (−60°) with respect to each other and still form a secure attachment. This triangular structure may be extended to six sided or eight sided connector structures that will mate at several regular angles.

Figure 13:
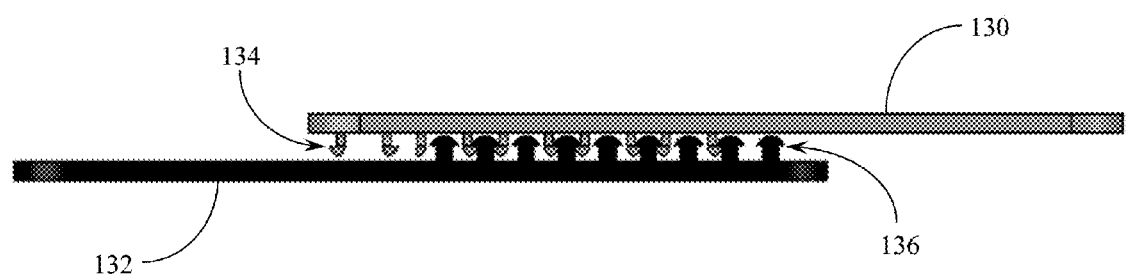
FIG. 13 is a side-edge view showing the manner of attachment between the top and bottom components shown in FIGS. 9A & 10A (for example).

FIG. 13 is a side-edge view showing the manner of attachment between the top 130 and bottom 132 components shown in FIGS. 9A & 10A (for example). A similar manner of attachment is applicable to the top and bottom components shown in FIGS. 7A & 8A, although the additional attachment slots and alignment bars therein would be visible. Ridges 134 in top component 130 provide the opposing pair ridges with inwardly directed pointed edges that surround and engage with post ridges 136 on bottom component 132 that include outwardly directed pointed edges.

Figure 14A:
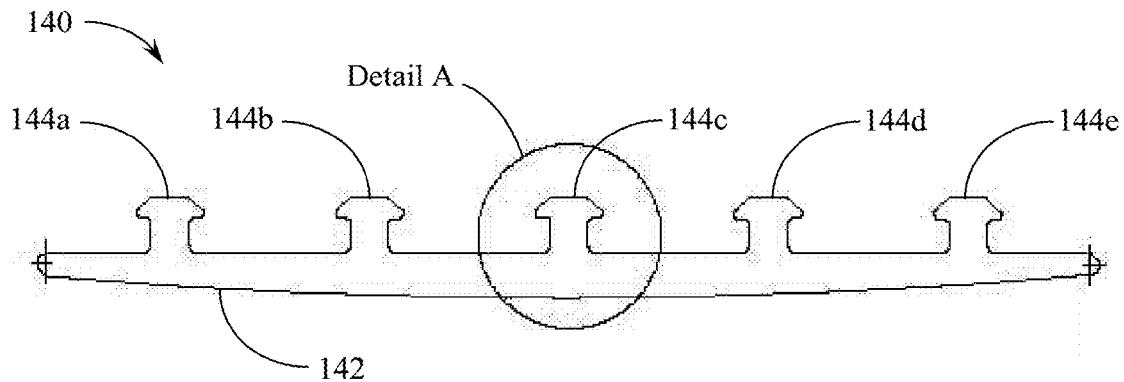
FIG. 14A is a cross-sectional view of a further embodiment of the present invention showing a connector bottom component capable of being manufactured using an extrusion process, viewed along Section Line C-C' in FIG. 14C.
Figure 14B:
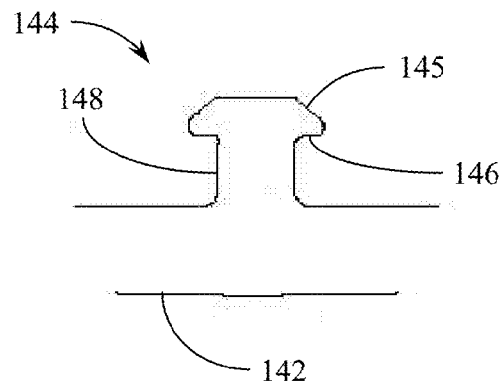
FIG. 14B is a detailed cross-sectional view of the connector bottom component shown in FIG. 14A (Detail A) disclosing the individual connector ridge structure.

Reference is next made to FIGS. 14A-14C, FIGS. 15A-15C, FIGS. 16A-16C, and FIGS. 17A-17C for a description of a further alternate embodiment of the present invention capable of being manufactured using an extrusion process. FIG. 14A is a cross-sectional view of an extrusion of plastic material configured with five rows of post-type ridges, viewed along Section Line C-C' in FIG. 14C. Connector bottom component 140 comprises a flat substrate 142, preferably on the order of one inch in width, although larger and smaller sizes are envisioned and possible, that supports (in this example) five post-type ridges 144a-144e. A detailed view (Detail A from FIG. 14A) of one of these post-type ridges 144 is shown in FIG. 14B. Positioned on substrate 142 is post section 148 (essentially a raised ridge that appears as a post in this cross-sectional view) that includes cap 145 having a pair of outwardly directed pointed edges 146. Edges 146 comprise rounded pointed edges to facilitate the latching and unlatching of the ridge from the opposing component described below.

Figure 14C:
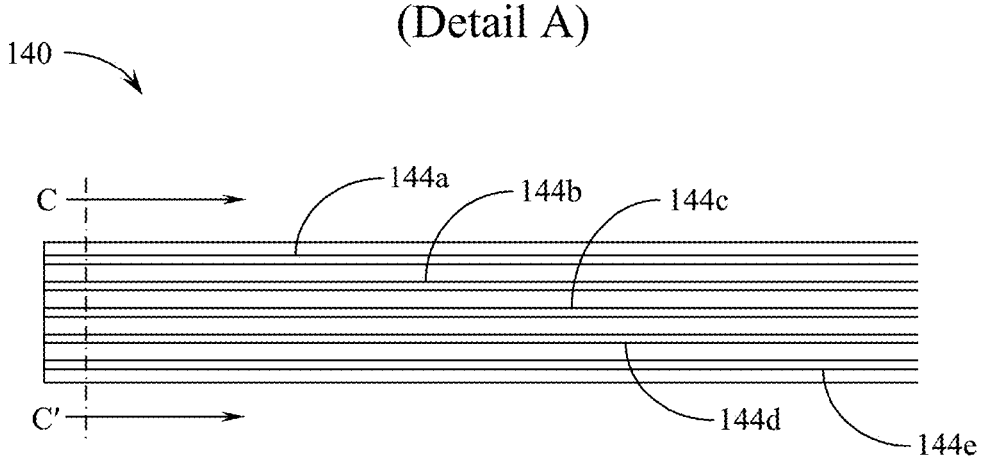
FIG. 14C is a top plan view of a section of the extrusion manufactured according to the structures of the connector bottom component shown in FIG. 14A.

FIG. 14C is a top plan view of a section of extruded bottom component 140 showing each of the five (in this example) ridges 144a-144e. Those skilled in the art will recognize how the described structure lends itself to manufacture by extrusion techniques.

Figure 15A:
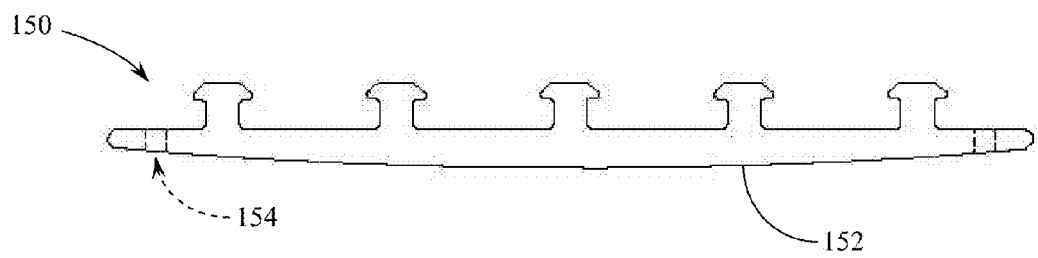
FIG. 15A is an end view of a portion of the connector bottom component of the embodiment of the present invention shown in FIG. 14A, cut from an extrusion, with holes positioned for attachment to a surface.
Figure 15B:
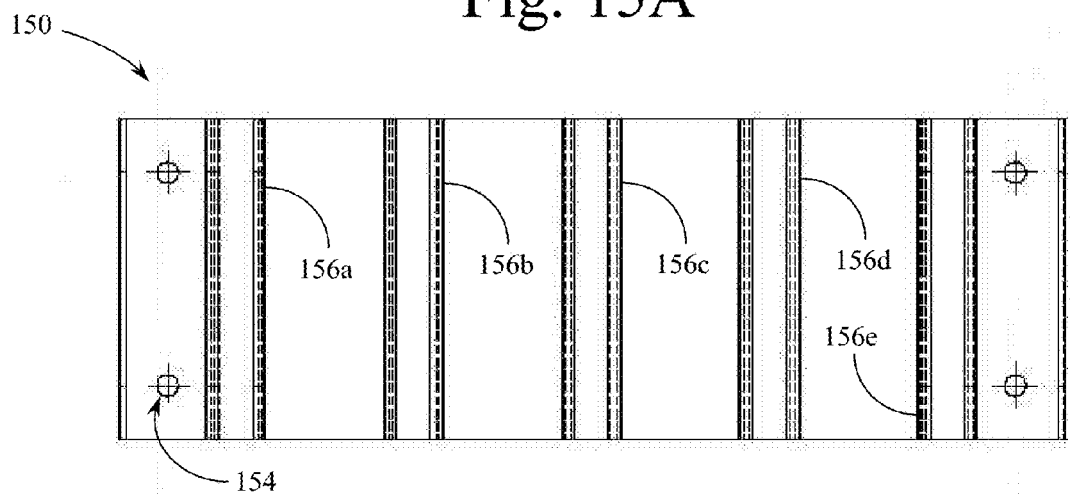
FIG. 15B is a top plan view of the portion of the connector bottom component shown in FIG. 15A.
Figure 15C:
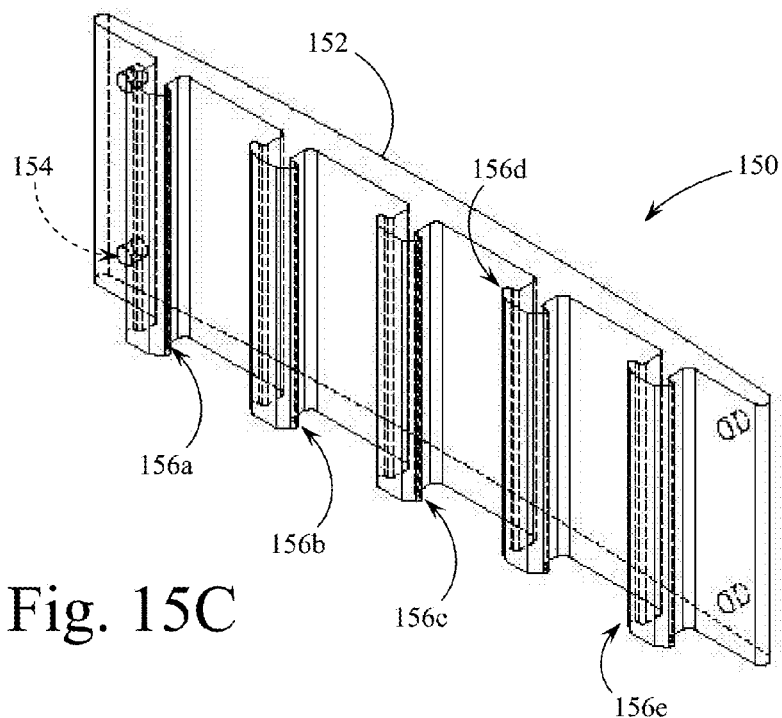
FIG. 15C is a perspective view of the portion of the connector bottom component shown in FIG. 15A.

FIGS. 15A-15C represent a section of the extrusion shown in FIGS. 14A-14C cut and modified to be used as a connector component. Bottom connector component 150 is shown to be structured on a section of substrate 152 with a number of attachment apertures 154 drilled or molded therein. Parallel post-type ridge sections 156a-156e are shown in a top plan view in FIG. 15B. FIG. 15C provides a perspective view showing both the arrangement of post-type ridge sections 156a-156e on substrate 152, as well as the placement of the plurality of apertures 154 drilled or molded into section of connector 150.

Figure 16A:
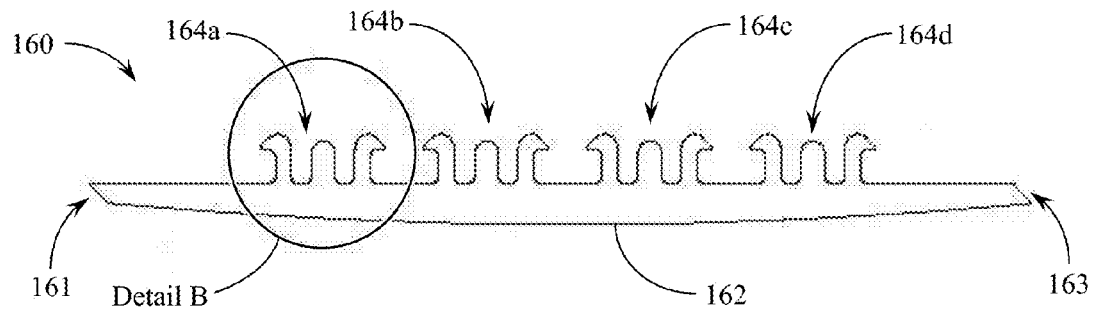
FIG. 16A is a cross-sectional view of the mateable section of the further embodiment of the present invention showing a connector top component capable of being manufactured using an extrusion process, viewed along Section Line D-D' in FIG. 16C.
Figure 16B:
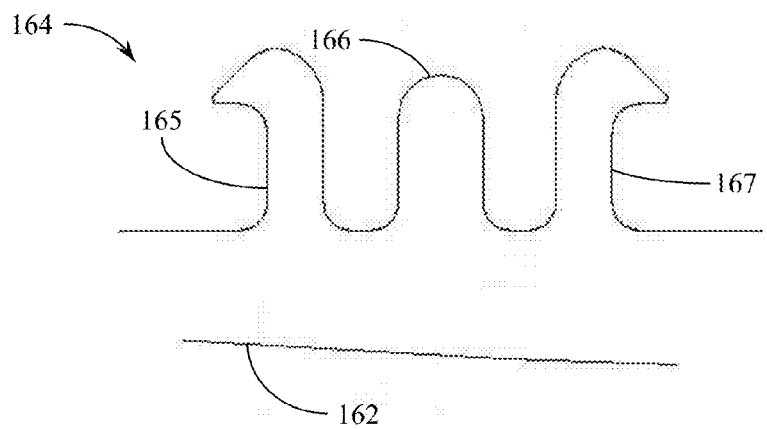
FIG. 16B is a detailed cross-sectional view of the connector top component shown in FIG. 16A (Detail B) disclosing the individual connector ridge structure.
Figure 16C:
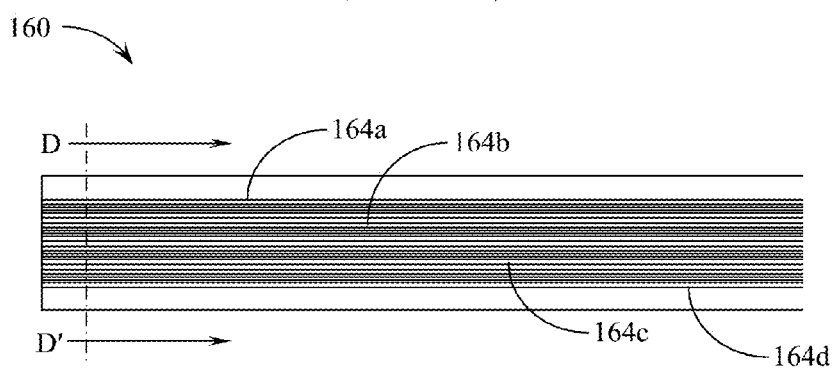
FIG. 16C is a top plan view of a section of the extrusion manufactured according to the structures of the connector top component shown in FIG. 16A.

FIG. 16A is a cross-sectional view of an extrusion of plastic material configured with four rows of paired opposing ridges, viewed along Section Line D-D' in FIG. 16C. Connector top component 160 comprises a flat substrate 162, preferably on the order of one inch in width, although larger and smaller sizes are envisioned and possible, that supports (in this example) four paired ridges 164a-164d. A detailed view (Detail B from FIG. 16A) of one of these pairs of opposing ridges 164 is shown in FIG. 16B. Positioned on substrate 162 are first and second opposing ridge walls 165 & 167. A blocking turret 166 is positioned between the first and second opposing ridge walls 165 & 167 to prevent that paired ridge row from impinging itself onto the ridge rails of the opposing part. In this manner the pointed edges of the respective ridges will always slide properly into the opposing part so that the pointed edges of the post ridge grasp the rail ridges of the opposing part. Angled edges 161 & 163 are provided to facilitate the fingertip attachment and release actions joining and separating the top and bottom components (see FIG. 18).

FIG. 16C is a top plan view of a section of extruded top component 160 showing each of the four (in this example) paired ridges 164a-164d. Those skilled in the art will recognize how the described structure lends itself to manufacture by extrusion techniques.

Figure 17A:
FIG. 17A is an end view of a portion of the connector top component of the embodiment of the present invention shown in FIG. 16A, cut from an extrusion, with holes positioned for attachment to a surface.
Figure 17B:
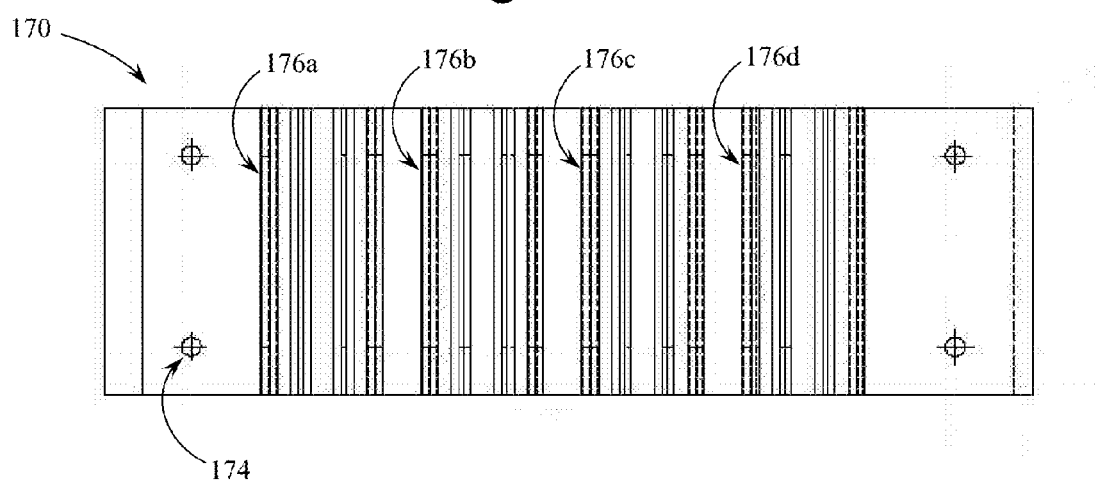
FIG. 17B is a top plan view of the portion of the connector top component shown in FIG. 17A.
Figure 17C:
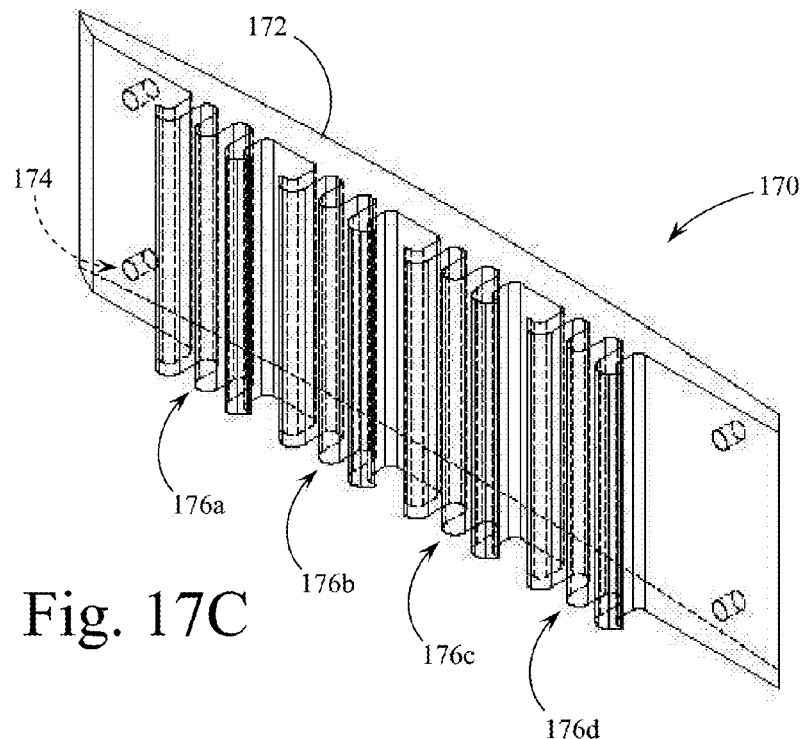
FIG. 17C is a perspective view of the portion of the connector top component shown in FIG. 17A.

FIGS. 17A-17C represent a section of the extrusion shown in FIGS. 16A-16C cut and modified to be used as a connector component. Top connector component 170 is shown to be structured on a section of substrate 172 with a number of attachment apertures 174 drilled or molded therein. Parallel opposing pair ridge sections 176a-176d are shown in a top plan view in FIG. 17B. FIG. 17C provides a perspective view showing both the arrangement of opposing pair ridge sections 176a-176d on substrate 172, as well as the placement of the plurality of apertures 174 drilled or molded into section of connector 170.

Figure 18:
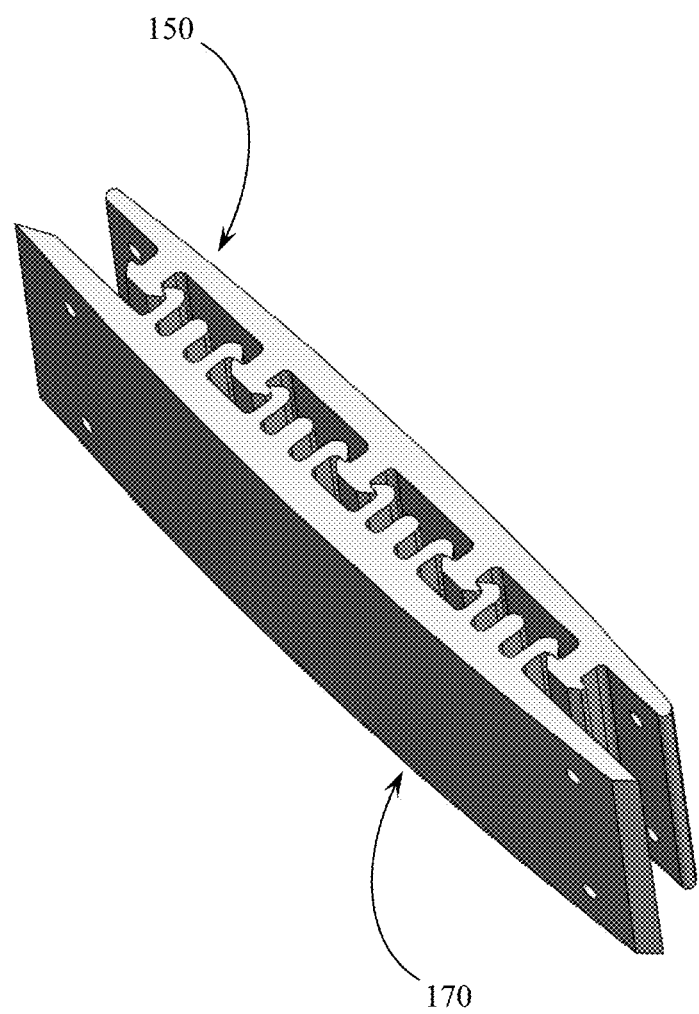
FIG. 18 is a perspective view of the connector top and bottom components shown in FIGS. 15C & 17C, showing the manner of attachment between the top and bottom components.

Reference is next made to FIG. 18 for a perspective view of the connector bottom and top components 150 & 170 shown in FIGS. 15C & 17C, showing the manner of attachment between these components. In use, each of the components 150 & 170 would be secured to a strap or belt using the above described holes in each component section. In the view of FIG. 18, the angled end edges of component 170 are shown to facilitate the releasing action whereby the user may grip the angled edge with a fingertip to begin the motion of pulling the top component up and away from the bottom component.

Alternate Preferred Embodiments

Reference is now made to FIGS. 19-26 for a description of a further alternate preferred embodiment of the attachment surfaces system of the present invention. In this alternate embodiment, a number of double-sided post ridges on a first clip component interact with a number of triplet ridge groups on a second clip component to appropriately secure two lengths of strap or other elements together. A number of applications are anticipated that utilize straps or bands, either as integral components on an object of clothing or the like, or as the ends of a single strap or band that is used to bind or bundle two or more objects together. The alternate preferred embodiment shown in FIGS. 19-26 provides for basic yet versatile clip components that incorporate a modified cross-sectional configuration for the interlocking ridges and slots utilized to attach one strap or band to another.

Figure 19:
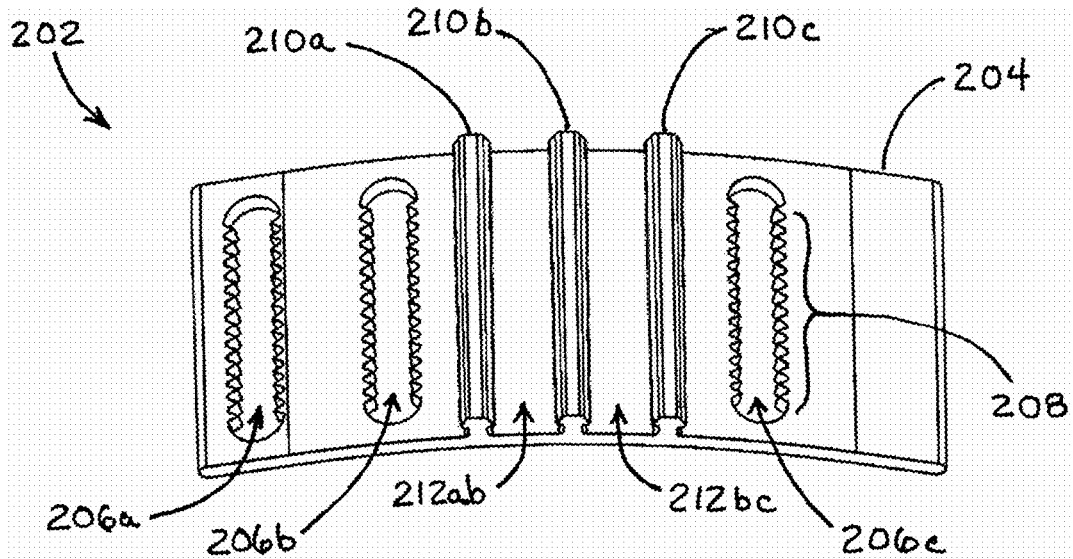
FIG. 19 is a perspective view of the inside face of the bottom clip component of a further alternate embodiment of the attachment surfaces system of the present invention.

FIG. 19 is a perspective view of the front face of bottom clip 202 which is generally constructed from bottom clip substrate 204 preferably made of semi-rigid plastic or elastomeric materials, including those with high rubber content. Alternately, the substrate of the clips in this further preferred embodiment may comprise metal materials having similar rigidity/flexibility characteristics. The construction materials must flex slightly at both the gross level (the overall clip) and at the interlocking feature level. Materials with greater rigidity (such as some metals or alloys) may be used where the clips are slid together rather than press fit together.

Bottom clip substrate 204 is molded or formed with strap apertures 206a-206c as shown. Each strap aperture 206a-206c is constructed with two opposing toothed edges 208. As described in detail below, these strap apertures provide appropriate placement, positioning, and securing of straps on the clips, utilizing the toothed edges to supply the necessary friction to variably fix the clips on the straps.

The operable portion of bottom clip 202 is made up of double-sided post ridges 210a-210c. Positioned between these post ridges are triplet slots 212ab & 212bc. In a preferred embodiment of the alternate clip structure shown in FIG. 19, bottom clip substrate 204 is curved to follow the general line of the straps in use around a bundle or across a curved surface (see FIG. 26, for example). The curve to bottom clip 202 matches the curve of top clip (described below) and facilitates not only their attachment together, but also their appropriate separation when required.

Figure 20:
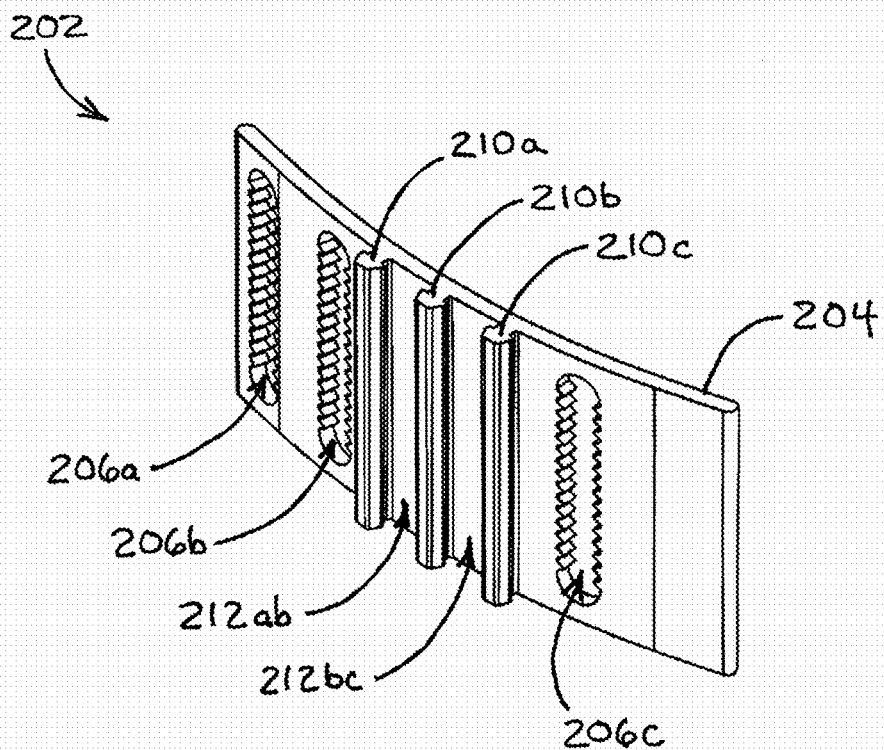
FIG. 20 is an isometric view of the bottom clip component shown in FIG. 19.

FIG. 20 shows in an isometric view the same components of bottom clip 202 generally disclosed in FIG. 19 with a clear view of double-sided post ridges 210a-210c. Also seen in clearer detail in the view of FIG. 20 are triplet slots 212ab & 212bc. Bottom clip 202 is preferably curved in a manner that presents a convex face towards the matching top clip and a concave face to the curved object or objects that are being strapped or banded.

Figure 21:
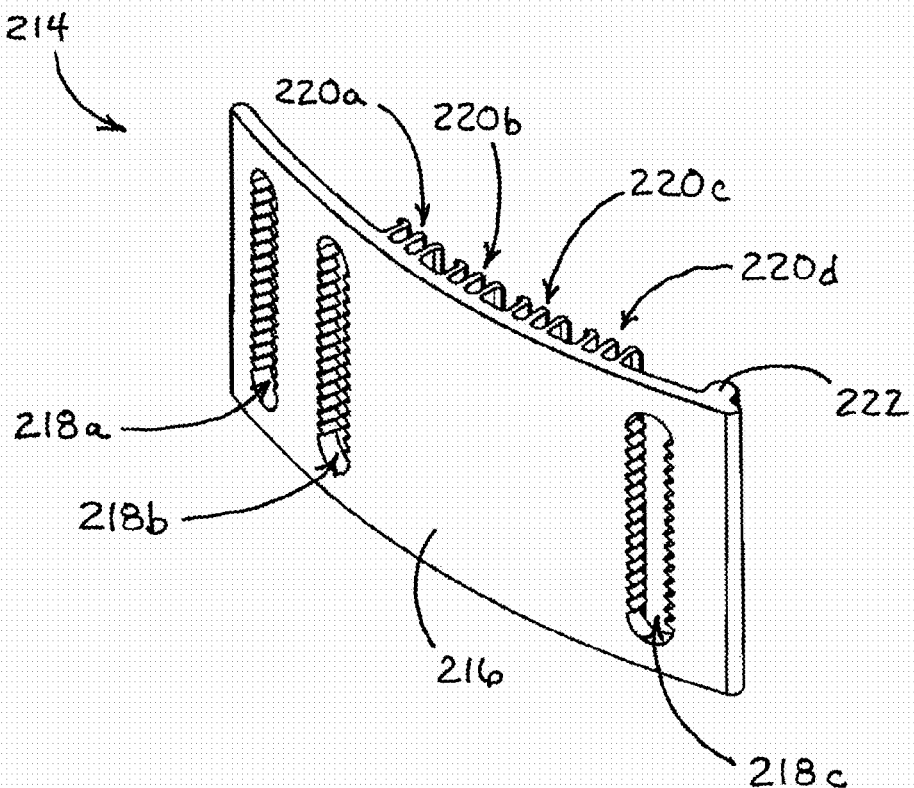
FIG. 21 is an isometric view of the top clip component of the further alternate preferred embodiment of the present invention, operable in connection with the bottom clip component shown in FIGS. 19 & 20.
Figure 22:
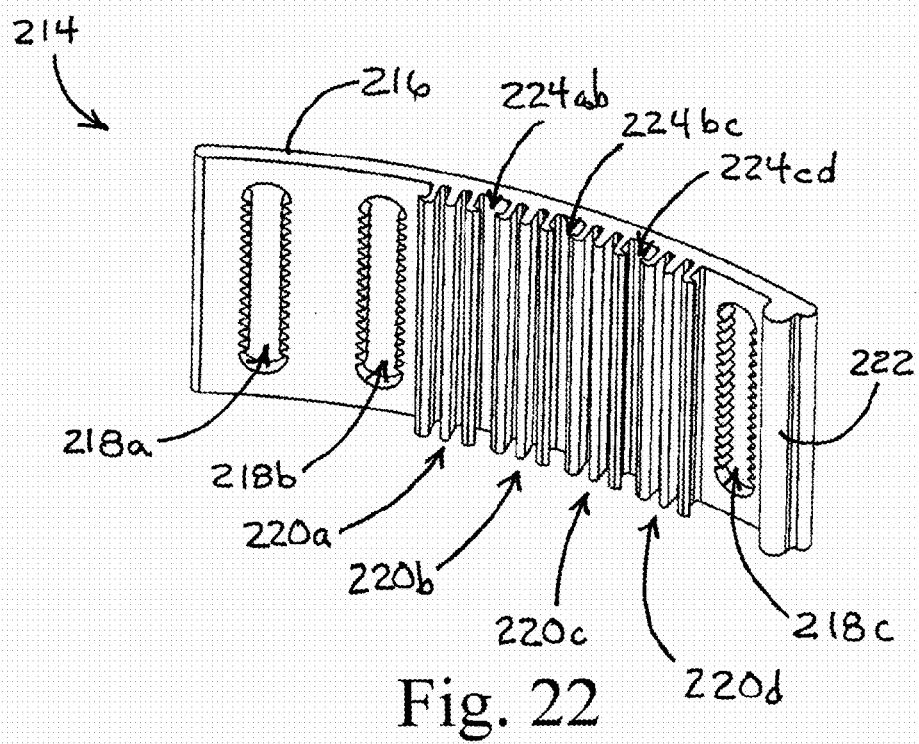
FIG. 22 is an isometric view of the obverse face of the top clip component shown in FIG. 21.

Reference is next made to FIGS. 21 & 22 for a detailed description of top clip 214 structured to be operable in conjunction with bottom clip 202 shown in FIGS. 19 & 20. Top clip 214 is constructed of top clip substrate 216 generally made of the same material as bottom clip 202 described above. Corresponding strap apertures 218a-218c are also provided for top clip 214 and provide the same function as the strap apertures for the bottom clip. In place of double-sided post ridges, top clip 214 is constructed with triplet ridge groups 220a-220d. The manner in which these triplet ridge groups operate to engage the double-sided post ridges of the bottom clip is described in more detail below. Top clip 214 additional incorporates spacer ridge 222 which facilitates the placement and spacing of the two clip components together and further facilitates the separation of the components by providing a finger-hold to the user next to the edge of top clip 214.

FIG. 22 is the obverse side of top clip 214 shown in FIG. 21. In this view, triplet ridge groups 220a-220d are shown in clear detail. Positioned between the triplet ridge groups are post slots 224ab, 224bc, and 224cd. The structure of spacer ridge 222 is also shown in clear detail in FIG. 22.

Figure 23:
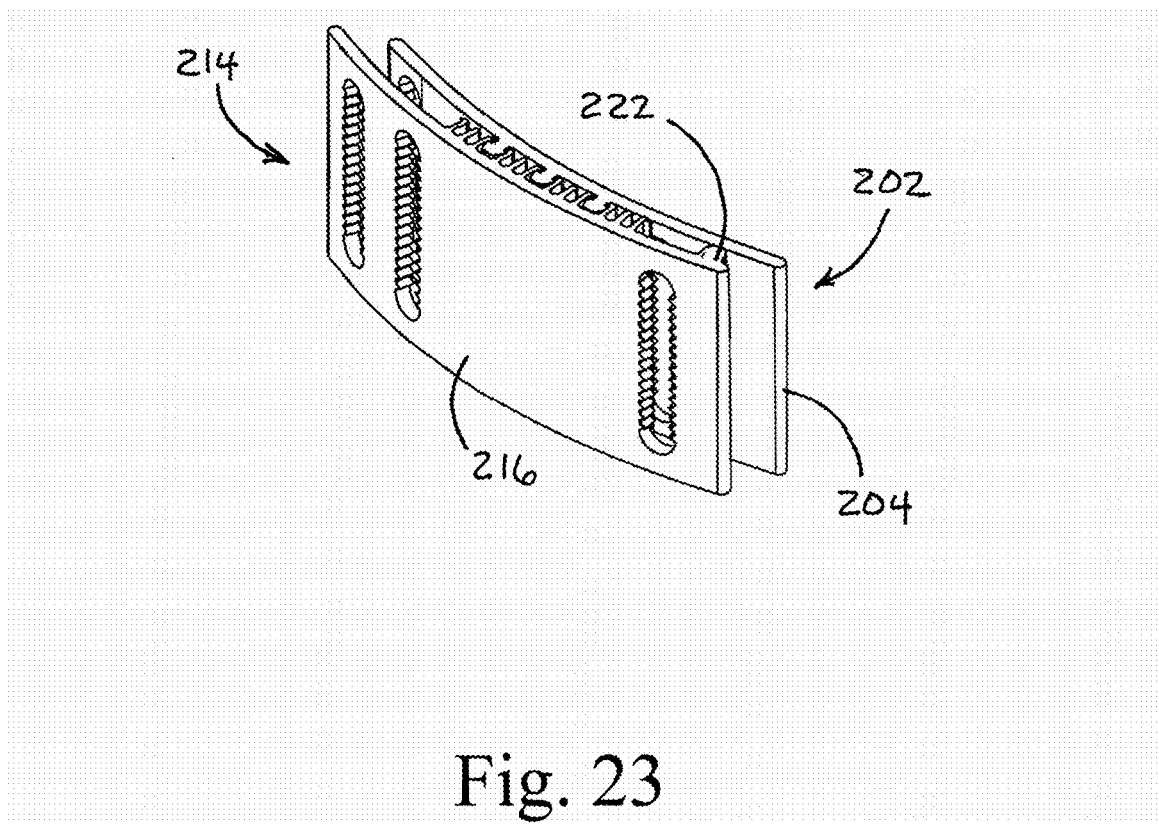
FIG. 23 is an assembly isometric view of the bottom clip and top clip components of the alternate preferred embodiment of the present invention, attached together.

FIG. 23 is an isometric view showing the assembly of the two components, bottom clip 202 and top clip 214. The curved substrates 204 & 216 are shown to follow the same line so as to provide a firm attachment between the attachment component faces for each clip. Also shown in FIG. 23 is the manner in which spacer ridge 222 serves to provide a gap between the clips that allows the user to pry the top clip away from the bottom clip through the simple use of a finger-hold.

Figure 24:
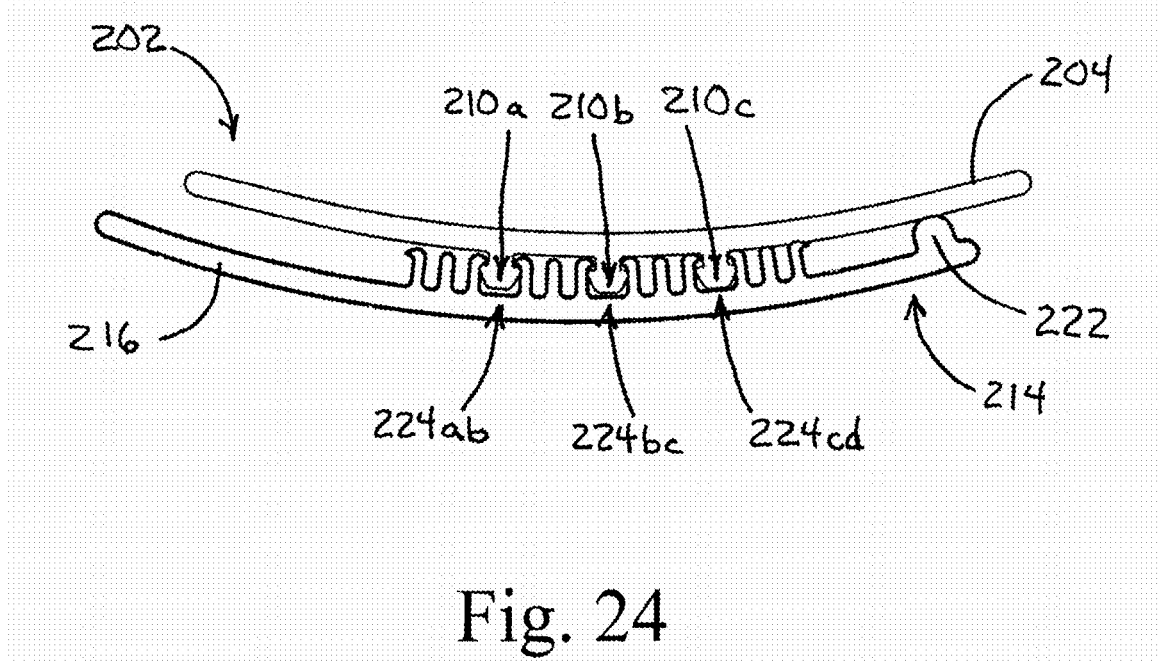
FIG. 24 is a top plan view of the connected top clip and bottom clip components of the alternate preferred embodiment of the present invention.

FIG. 24 shows the same assembly of FIG. 23 in a top plan view wherein the manner in which double-sided post ridges 210a-210c are received into and secured within post slots 224ab, 224bc, and 224cd. The arrangement and number of the double-sided post ridges and the triplet ridge groups shown in FIG. 24 is optimal for use of the two part attachment surfaces in connection with a cap or the like (see FIG. 26). Those skilled in the art will recognize that attachment between two clip components may be made with as few as one double-sided post ridge in connection with two triplet ridge groups, or one triplet ridge group in connection with two double-sided post ridges. This versatility is an important feature of the structural detail of the alternate preferred embodiment. Preferably, there are at least three double-sided post ridges operable in connection with at least four triplet ridge groups.

It should also be recognized that with the number of post ridges and triplet ridge groups shown in FIG. 24 the clip becomes adjustable, wherein the length of the straps to which the clip components are secured becomes widely adjustable. In other words, although the arrangement shown in FIG. 24 secures each of the three double-sided post ridges 210a-210c between triplet ridge groups, top clip 214 may be moved laterally along bottom clip 202 such that only one or two of the double-sided post ridges are secured between triplet ridge groups. Clearly, the more post ridges that are secured between triplet ridge groups, the stronger the attachment. Nonetheless, the clips structured as shown provide adequate and secure attachment with as few as one double-sided post ridge engaged between two triplet ridge groups.

Figure 25:
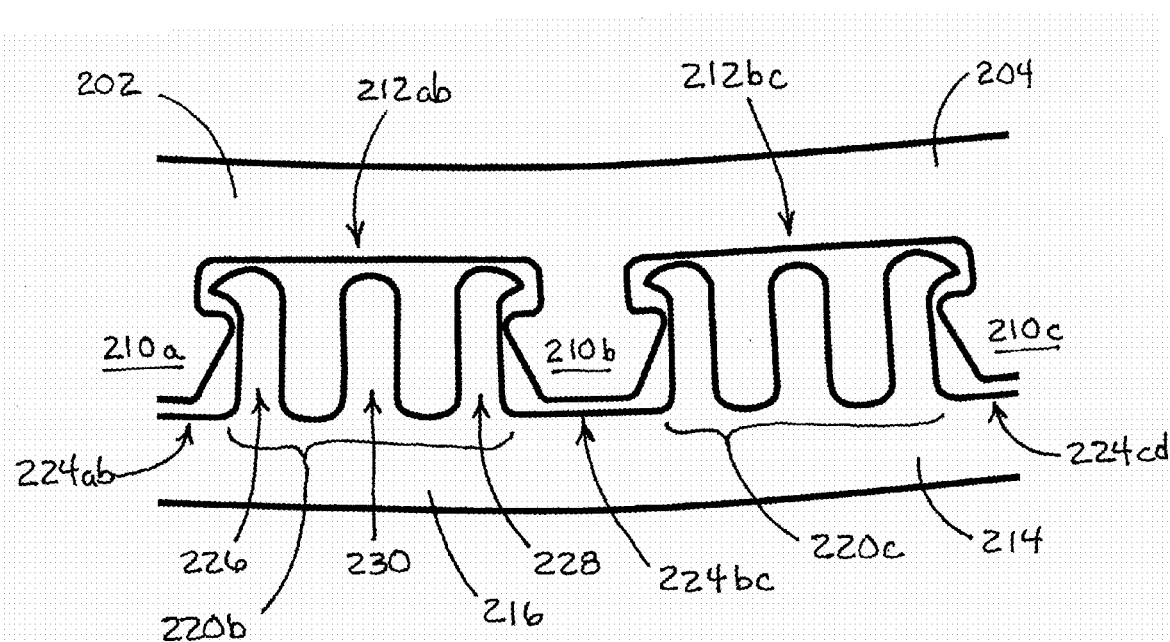
FIG. 25 is a detailed top plan view of the connected top clip and bottom clip components shown in FIG. 24, disclosing the manner in which the interacting ridges and channels are removably secured together.

FIG. 25 is a detailed view of the functional interconnection between top clip 214 and bottom clip 202. The detailed structures of the double-sided post ridges and of the triplet ridge groups are shown. These structures are, of course, repeated with each of the double-sided post ridges utilized and each of the triplet ridge groups utilized. In FIG. 25, double-sided post ridge 210b is removably secured in post slot 224bc between triplet ridge group 220b and 220c. Triplet ridge group 220b is positioned within triplet slot 212ab and triplet ridge group 220c is secured within triplet slot 212bc.

Double-sided post ridge (210b as an example) is preferably constructed with a trapezoidal cap or head portion for the ridge that forms a captive slot on either side of the ridge. The trapezoidal head portion is preferably rounded on each side while retaining a flat top to provide complete engagement into the post slot as shown. The rounded edges to the trapezoidal head facilitate the easy insertion and removal of the post ridge into the post slot.

Each triplet ridge group (220b & 220c for example in FIG. 25) is made up of first prong ridge 226, blocking ridge 230, and second prong ridge 228. Each of these individual ridges in the triplet ridge group serves an important function. First and second prong ridges 226 & 228 provide opposing prong ridge edges that engage the captive slots in the double-sided post ridge. From the view shown in FIG. 25 it will be recognized that blocking ridge 230 serves the important function of preventing the insertion of double-sided post ridge 220b (for example) between a first prong ridge 226 and a second prong ridge 228 within the same group. Such insertion would provide no means for securing the two components together because of the outward orientation of the prong edges. Instead, blocking ridge 230 serves to direct double-sided post ridge 210b to engage only between a second prong ridge 228 of a first triplet ridge group 220b and the first prong ridge of a second triplet ridge group 220c. As shown in FIG. 25, the cross-section of double-sided post ridge 210b is preferably an isosceles trapezoid. In this manner, only the appropriate engagement between the opposing ridges is allowed.

Figure 26:
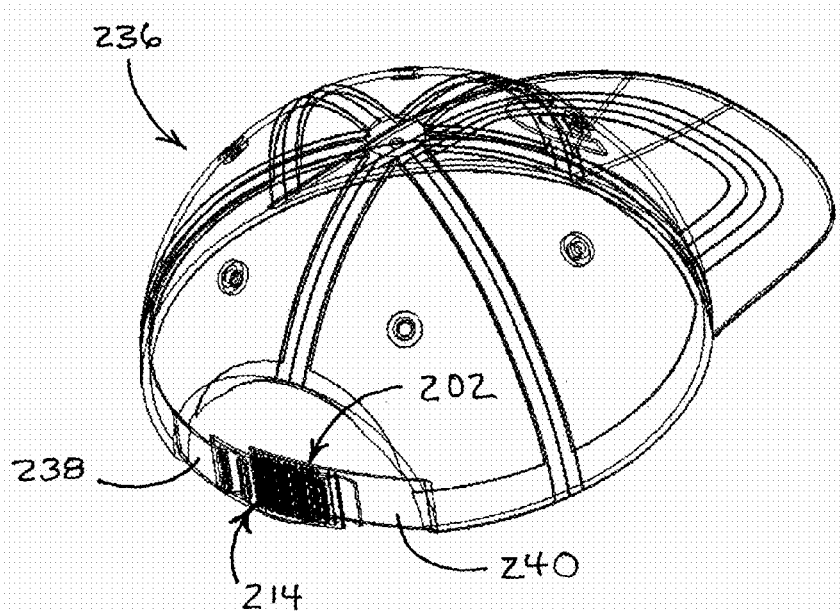
FIG. 26 is a perspective view of a cap implementing the top and bottom clips of the alternate preferred embodiment of the present invention, as shown in FIGS. 19-25.

Reference is finally made to FIG. 26 for a description of one example of the utilization of the alternate preferred embodiment of the attachment surface system of the present invention shown generally in FIGS. 19-25. In this application example, cap 236 is constructed with two straps across the back (as is typical in the art) that are adjustably secured together to allow the cap to be worn by a variety of individuals with different sized heads. Top strap 238 is variably positioned with bottom strap 240 to secure cap 236 to the head. Top strap 238 is secured to top clip 214 by weaving the strap through the strap apertures (see FIG. 21 for appropriate apertures for example) and bottom strap 240 is secured to bottom clip 202 in a similar manner, weaving the strap through the strap apertures therein. Once again, the strap apertures on each of the two clips are constructed with toothed internal edges that provide enough friction such that weaving the strap through the apertures secures the clip in a relatively fixed position on the strap. Fine adjustment of the overall securement between bottom strap 240 and top strap 238 may be made by adjusting the placement and positioning of the straps within the strap apertures on each of the two clips. Once such fine adjustment is made (preferably with the cap removed from the wearer's head), the two clip components may be secured together at any of a number of adjustable positions. As described above, the two clips may be adequately secured together with as few as one double-sided post ridge engaging two triplet ridge groups. As many as six different positions may be utilized in this manner, wherein at least one double-sided post ridge engages two triplet ridge groups, in the arrangement shown in FIG. 24 with three double-sided post ridges engaging four triplet ridge groups. Increasing the number of post ridges and triplet ridge groups by one each increases the number of secure positions by two (adding one new position to each end of the series).

Although the present invention has been described in conjunction with a number of preferred embodiments, those skilled in the art will recognize modifications to these embodiments that still fall within the scope of the present invention. Because of the wide variety of applications for the attachment surfaces of the present invention, the dimensions of the straps, bands, or patch surfaces may be structured as small or as large as required. In the final described alternate preferred embodiment, the curvature of the clip substrates may be varied according to the particular application to which the straps or bands are being applied. In addition, the alternate preferred embodiments disclosed may utilize alignment or sliding stop bars such as the alignment bars shown in FIGS. 7A-7D and FIGS. 8A-8D. Where it is preferable to utilize the sliding engagement of the clips as described above (positioning the clips edge to edge and sliding the post ridges into the post slots), a more rigid construction material may be used. Where a press-fit attachment is preferred, a more flexible construction material may be used. The width of the clip components may also be varied although increasing the width does increase the press-fit force required to engage the clips together and the reverse prying force required to separate the clips. Clip widths in the range of one-half inch to two inches are preferred.

We claim:

1. Interlocking attachment surfaces, releasably connectable one to another in a face to face orientation, the attachment surfaces comprising:
   a first attachment surface comprising a first substrate and a plurality of parallel double-sided post ridges spaced one from the next at a first gap distance, each double-sided post ridge having a height, and comprising parallel first and second ridge side walls supporting a ridge cap having a generally isosceles trapezoid shaped cross-section pointing away from the first substrate, the ridge cap having a base width and a top width; and
   a second attachment surface comprising a second substrate and a plurality of parallel triplet ridge groups spaced one from the next group at a second gap distance generally equal to the base width of the ridge caps of the first attachment surface, each triplet ridge group comprising parallel first and second outward oriented prong ridges, and a single blocking ridge positioned between and parallel to the prong ridges, each of the prong ridges having a common height generally equal to the height of the double-sided post ridges on the first attachment surface, and each blocking ridge having a height equal to or less than the prong ridges;
   wherein when the first and second attachment surfaces are connected together, the ridge cap of each double-sided ridge post is inserted into the second gap between two triplet ridge groups and is prevented from being inserted between the prong ridges of an individual triplet ridge group by the blocking ridge.

2. The interlocking attachment surfaces of claim 1 wherein the substrates of the first and second attachment surfaces comprise curved substrates.

3. The interlocking attachment surfaces of claim 1 wherein the first and second outward oriented prong ridges each comprise rounded tops with outward oriented pointed edges, a distance between the outward oriented pointed edges of each triplet ridge group being generally equal to the first gap distance of the first attachment surface.

4. The interlocking attachment surfaces of claim 1 wherein the first and second outward oriented prong ridges each comprise flexible material that allows the prong ridges to bend inward when a ridge cap of a double-sided ridge post is inserted into the second gap between two triplet ridge groups.

5. The interlocking attachment surfaces of claim 2 wherein the substrate of the first attachment surface comprises a convex curve on a double-sided post ridge side of the substrate and the substrate of the second attachment surface comprises a concave curve on a triplet ridge group side of the substrate.

6. The interlocking attachment surfaces of claim 1 wherein the plurality of double-side post ridges comprises three double-sided post ridges and the plurality of triplet ridge groups comprises four triplet ridge groups.

7. The interlocking attachment surfaces of claim 1 wherein the plurality of double-side post ridges comprises five double-sided post ridges and the plurality of triplet ridge groups comprises four triplet ridge groups.

8. The interlocking attachment surfaces of claim 1 wherein the substrates of the first and second attachment surfaces further define at least one aperture through each substrate, the at least one aperture on each substrate positioned to receive and retain one of two flexible straps, wherein when the first and second attachment surfaces are connected together, the two flexible straps are connected together.

9. The interlocking attachment surfaces of claim 8 wherein at least one substrate defines two adjacent apertures to receive and adjustably retain one of two flexible straps.

10. The interlocking attachment surfaces of claim 5 wherein the first and second attachment surfaces adjustably secure a hat band together.

11. Interlocking attachment surfaces, releasably connectable one to another in a face to face orientation, the attachment surfaces comprising:
    a first attachment surface comprising a first substrate and a plurality of parallel double-sided post ridges spaced one from the next at a first gap distance, each double-sided post ridge having a height, and comprising parallel first and second ridge side walls supporting a ridge cap having a generally isosceles trapezoid shaped cross-section pointing away from the first substrate, the ridge cap having a base width and a top width; and
    a second attachment surface comprising a second substrate and a plurality of parallel triplet ridge groups spaced one from the next group at a second gap distance generally equal to the base width of the ridge caps of the first attachment surface, each triplet ridge group comprising parallel first and second outward oriented prong ridges and a single blocking ridge positioned between and parallel to the prong ridges, the first and second outward oriented prong ridges each comprising rounded tops with outward oriented pointed edges, a distance between the outward oriented pointed edges of each triplet ridge group being generally equal to the first gap distance of the first attachment surface, each of the prong ridges having a common height generally equal to the height of the double-sided post ridges on the first attachment surface, and each blocking ridge having a height equal to or less than the prong ridges;
    wherein when the first and second attachment surfaces are connected together, the ridge cap of each double-sided ridge post is inserted into the second gap between two triplet ridge groups and is prevented from being inserted between the prong ridges of an individual triplet ridge group by the blocking ridge.

* * * * *